(12) United States Patent
Morton (10) Patent No.: US 10,995,885 B2
(45) Date of Patent: May 4, 2021

(54) SNAP TOGETHER TUBE ASSEMBLY AND MANUFACTURING PROCESS

(71) Applicant: Philip G. Morton, Germantown, OH (US)

(72) Inventor: Philip G. Morton, Germantown, OH (US)

(73) Assignee: DECEUNINCK NORTH AMERICA, LLC, Monroe, OH (US)

( * ) Notice: Subject to any disclaimer, the term of this patent is extended or adjusted under 35 U.S.C. 154(b) by 0 days.

(21) Appl. No.: 16/584,179

(22) Filed: Sep. 26, 2019

(65) Prior Publication Data

US 2020/0018430 A1   Jan. 16, 2020

Related U.S. Application Data

(63) Continuation of application No. 15/784,266, filed on Oct. 16, 2017, now Pat. No. 10,451,200.
(Continued)

(51) Int. Cl.
*F16L 9/22* (2006.01)
*F16B 21/06* (2006.01)
(Continued)

(52) U.S. Cl.
CPC ............... *F16L 9/22* (2013.01); *B29C 70/52* (2013.01); *E06B 1/30* (2013.01); *F16B 5/126* (2013.01);
(Continued)

(58) Field of Classification Search
CPC .... F16L 9/22; E06B 1/30; F16B 5/126; F16B 5/128
(Continued)

(56) References Cited

U.S. PATENT DOCUMENTS 3,757,031 A * 9/1973 Izraeli .................. H02G 15/113
174/138 F
3,761,603 A * 9/1973 Hays ..................... H02G 3/045
174/101
(Continued)

FOREIGN PATENT DOCUMENTS

AU       1834383       3/1984
CN       2315686       4/1999
(Continued)

OTHER PUBLICATIONS

EP, European Search Report and Opinion; European patent application serial No. 17862057.1; 10 pages (dated Jun. 17, 2020).
(Continued)

*Primary Examiner* — Patrick F Brinson
(74) *Attorney, Agent, or Firm* — Thompson Hine LLP (57) ABSTRACT

An assembly including a first elongated rail having a male snap member extending along its length, the male snap member having a groove extending along its length, and a second elongated rail having a female snap member extending along its length. The female snap member has a first leg and a second leg, the first leg including a foot. The male snap member is receivable between the first and second legs of the female snap member such that the foot of the female snap member is received in the groove of the male snap member to exert a force that retains the male and female snap members together such that the first and second rails are assembled to form a hollow tube.

20 Claims, 9 Drawing Sheets

Related U.S. Application Data (60) Provisional application No. 62/408,997, filed on Oct. 17, 2016.

(51) Int. Cl.
  *E06B 1/30* (2006.01)
  *B29C 70/52* (2006.01)
  *F16B 5/12* (2006.01)
  *B29K 309/02* (2006.01)
  *B29L 31/00* (2006.01)
  *B29K 75/00* (2006.01)

(52) U.S. Cl.
  CPC .......... *F16B 21/06* (2013.01); *B29K 2075/00* (2013.01); *B29K 2309/02* (2013.01); *B29L 2031/003* (2013.01); *F16B 5/128* (2013.01)

(58) Field of Classification Search
  USPC .................................................. 138/162, 157
  See application file for complete search history.

(56) References Cited

U.S. PATENT DOCUMENTS

| | | | |
|---|---|---|---|
| 4,019,301 A | 4/1977 | Fox | |
| 4,390,164 A | 6/1983 | Cokelekoglu | |
| 4,391,303 A * | 7/1983 | Holgersson | H02G 3/0425 138/166 |
| 4,769,963 A | 9/1988 | Meyerson | |
| 4,951,716 A * | 8/1990 | Tsunoda | H02G 3/0418 138/157 |
| 5,007,666 A * | 4/1991 | Kyfes | B29C 65/58 138/162 |
| 5,134,250 A * | 7/1992 | Caveney | H02G 3/0418 138/162 |
| 5,217,771 A | 6/1993 | Schmanski et al. | |
| 5,343,666 A | 6/1994 | Haddad et al. | |
| 5,435,606 A | 7/1995 | Navazo | |
| 5,462,312 A * | 10/1995 | Carpenter | F16L 7/00 285/15 |
| 6,247,500 B1 * | 6/2001 | McMahon | F16L 9/22 138/157 |
| 6,357,196 B1 | 3/2002 | McCombs | |
| 6,390,139 B1 * | 5/2002 | Kang | F16L 9/22 138/120 |
| 6,490,836 B1 | 12/2002 | Moriau et al. | |
| 6,550,819 B2 * | 4/2003 | DeSanto, Sr. | F16L 5/00 285/192 |
| 7,416,227 B1 * | 8/2008 | Earnest | F16L 55/1608 138/162 |
| 7,784,745 B2 * | 8/2010 | Dodge | F16L 3/1075 248/73 |
| 8,028,486 B2 | 10/2011 | Pervan et al. | |
| 8,183,460 B2 | 5/2012 | Williams | |
| 8,302,363 B1 | 11/2012 | Johnson | |
| 2005/0109415 A1 * | 5/2005 | Snyder | F24F 13/0209 138/162 |
| 2006/0185270 A1 | 8/2006 | Handley et al. | |
| 2007/0235212 A1 | 10/2007 | Waldorf et al. | |
| 2008/0148679 A1 | 6/2008 | Gilbert | |
| 2009/0294600 A1 | 12/2009 | Dodge | |
| 2011/0126487 A1 | 6/2011 | Browning et al. | |
| 2011/0173978 A1 * | 7/2011 | Rekret | F16L 1/15 60/641.7 |

FOREIGN PATENT DOCUMENTS

| | | |
|---|---|---|
| CN | 2800608 | 7/2006 |
| CN | 201155084 | 11/2008 |
| CN | 101591989 | 12/2009 |
| CN | 202231373 | 5/2012 |
| CN | 202454989 | 9/2012 |
| EP | 0011901 | 6/1980 |
| WO | 2005/067544 | 7/2005 |

OTHER PUBLICATIONS

PCT, International Search Report and Written Opinion, International Application No. PCT/US2017/056728 (dated Dec. 28, 2017).
CN, Notification of the First Office Action with English translation; Chinese patent application No. 201780063983.5; 11 pages (dated Dec. 5, 2019).
Canadian Intellectual Property Office, Office Action for Canadian Patent Application No. 3039687, 5 pages (dated Oct. 22, 2020).

\* cited by examiner

SNAP TOGETHER TUBE ASSEMBLY AND MANUFACTURING PROCESS

This application is a continuation of U.S. application Ser. No. 15/784,266 filed on Oct. 16, 2017, which in turn claims priority to U.S. Application Ser. No. 62/408,997, filed on Oct. 17, 2016. The entire contents of both of these applications are incorporated by reference herein.

TECHNICAL FIELD

The invention relates to the manufacturing of hollow tube profiles using thermoset pultrusion technology. The invention is particularly advantageous for the production of hollow tube profiles made from polymeric resin reinforced with glass fibers.

BACKGROUND

In many applications, including the production of window and door frames, the use of a pultruded fiberglass profile with one or more hollow cavities is desirable based on its favorable strength, thermal and material properties. However, significant manufacturing limitations exist with respect to current processes for pultruding fiber reinforced polymer based profiles, especially when using polyurethane resins. To pultrude a continuous profile with a hollow cavity, the pultrusion toolset requires an elongated mandrel supported only at the beginning stage of the pultrusion process. This presents many technical difficulties and cost disadvantages in comparison to the production of non-hollow profiles. The design, manufacture and set up of a mandrel toolset takes significantly longer, increasing costs by 40%-100% over non-mandrel toolsets. The production output of a mandrel toolset may be 50%-75% less because the line speed must be reduced to account for reduced heat control. In addition, the strain on the process puller may be increased by a factor of 5 to 10 times due to the drag of the mandrel on the part as it cures and shrinks during processing. But most importantly, because the mandrel may only be supported in the first 10 inches of the input end of the toolset, which is normally 90 to 100 inches long, the mandrel is subject to much flexing and movement from the hydraulic pressures exerted 80 to 90 inches downstream. Such flexing and movement of the mandrel destabilizes the process, which adversely affects the consistency of the wall thickness and the overall dimensional stability of the hollow profile. As a result, pultruded hollow profiles commonly have lower part quality and consistency than non-mandrel/non-hollow profiles.

Accordingly, an improved process for producing elongated hollow profiles is needed. In particular, an improved process is needed for manufacturing elongated fiberglass tubes using a continuous pultrusion process.

SUMMARY OF INVENTION

According to the present invention, a continuous hollow profile is constructed from two or more non-hollow pultruded rails that are assembled together. Specifically, each rail may be formed with snap members that extend along the rail's entire length. Using this snap fit arrangement, two or more non-hollow rails can be secured together along their length to form complex shapes, including complex hollow shapes, that possess strength comparable to unitary frames formed from other materials.

The strength and manufacturability of the hollow profile is influenced by the structure of the snap arrangement. According to a first aspect, the male and female snap members have mating features that when snapped together, not only prevent the rails from being pulled apart, but also provide a clamping force that pulls the rails together. This feature ensures that if an adhesive is applied between the male and female snap members before they are assembled together, the adhesive will set up without the need for additional or external clamps to hold the rails tight. The clamping force between the male and female member is produced by one or more angled surfaces on one or both of the male and female members. Specifically, elastic deformation of either the male or female member results in a normal force exerted on the other snap member. When this force is exerted on an angled surface, it produces a component force along the direction of engagement that urges the male member farther into the female member—clamping them together.

According to a second aspect, the male and female snap members are precisely dimensioned so that, when fully assembled together, at least one exterior surface of each member lines up flush with the exterior surface of the other member. The self-clamping feature in conjunction with this self-aligning feature ensures that the joint between the snap members is held very tight, giving it the appearance of a single, unitary piece.

According to a third aspect, the male and female snap members are cooperatively designed so that when fully assembled together they maintain small pockets of space between them where excess adhesive can accumulate rather than being forced out from between the snap to the exterior. This eliminates the need to remove excess adhesive on the exterior surface, which provides a cleaner appearance that more closely resembles a unitary piece rather than a two piece assembly.

DETAILED DESCRIPTION

Figure 1:
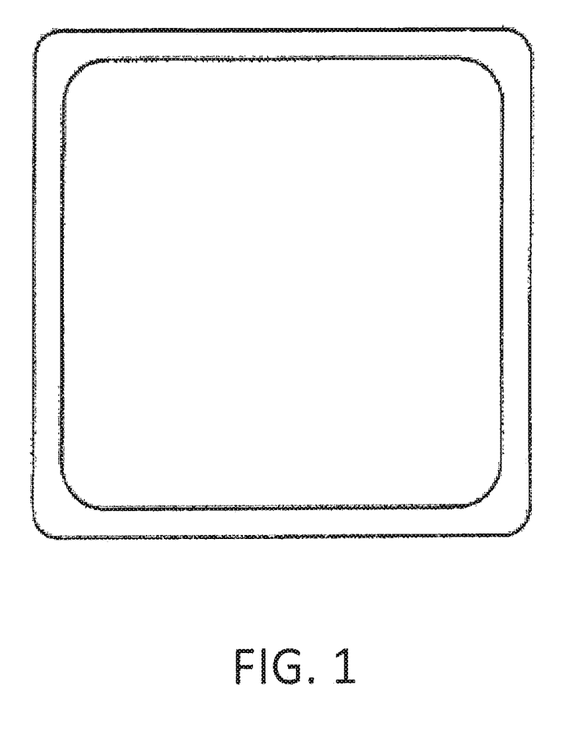
FIG. 1 shows a cross-section of a of an elongated, unitary hollow tube.

Unitary hollow tube profiles, like the one depicted in FIG. 1, are known. The elongated tube may have a square cross-section, as shown, a circular cross-section, or any complex hollow profile. The hollow profile may be manufactured by extrusion, pultrusion, or other known manufacturing processes. In addition, the hollow tube profile may be made from any of a wide variety of known construction materials. However, production of fiber-reinforced hollow profiles using pultrusion presents manufacturing obstacles. The present invention overcomes those obstacles by pultruding fiber-reinforced, non-hollow rails that can then be assembled into complex hollow shapes that exhibit strength and stability on par with unity parts.

Figure 2:
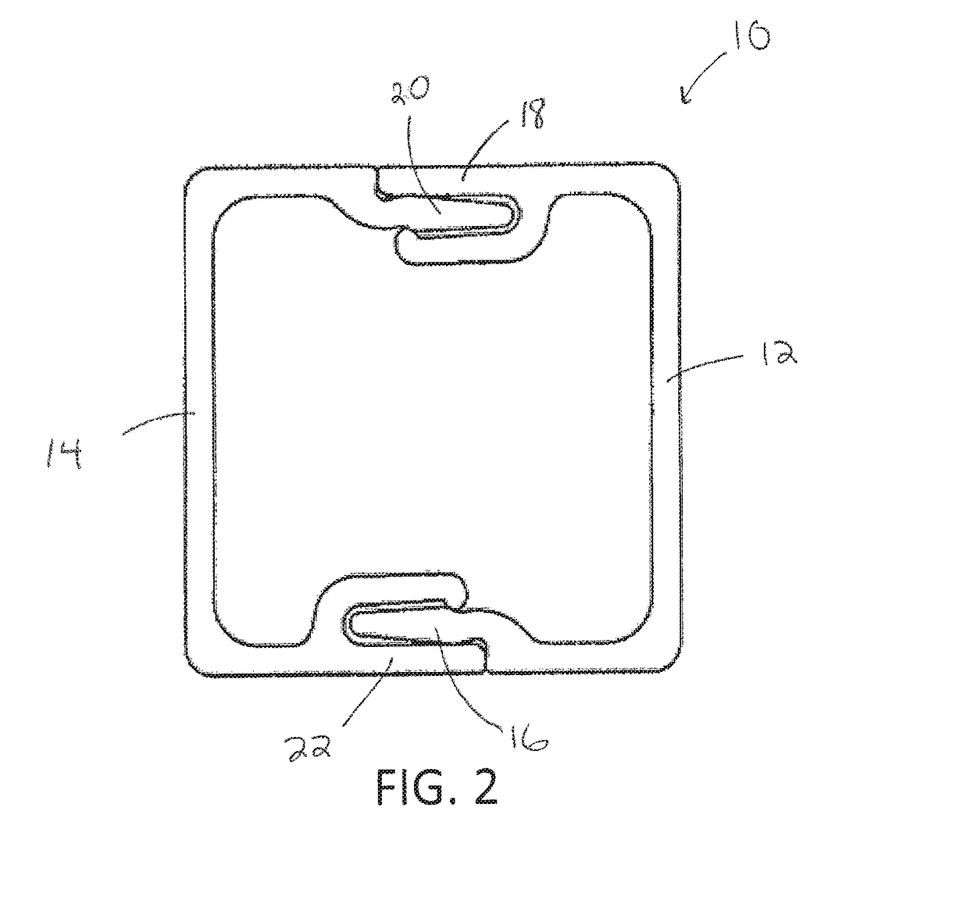
FIG. 2 is a cross-sectional view of one embodiment of a self-clamping snap tube according to the invention.

FIG. 2 depicts a cross-section of an elongated snap tube 10 according to one embodiment of the invention. The hollow tube is formed from a first elongated rail 12 and a second elongated rail 14. The first rail 12 is formed with male and female snap members 16 and 18, respectively, that extend along the rail's entire length. The second rail 14, which is identical to the first rail 12, and which can be produced using the same pultrusion toolset as the first rail, likewise has a male snap member 20 and a female snap member 22 that extend along the rail's entire length. When the first rail 12 and second rail 14 are mated together, an elongated hollow tube structure is formed. Of course, the square tube shown in FIG. 2 is only one embodiment. As shown in FIGS. 3-6, other hollow profiles, including complex hollow shapes, can be formed using this process.

Figure 3:
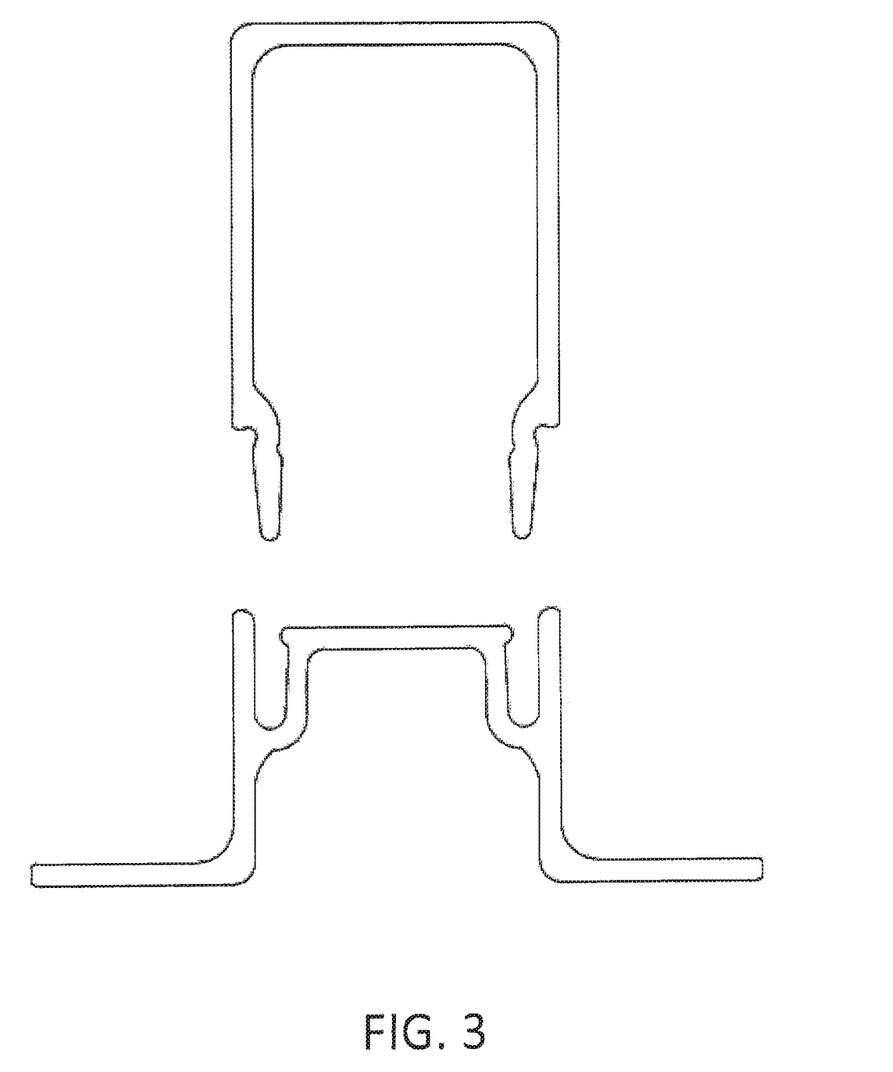
FIG. 3 is a cross-sectional view of a second embodiment of a snap tube prior to assembly.
Figure 4:
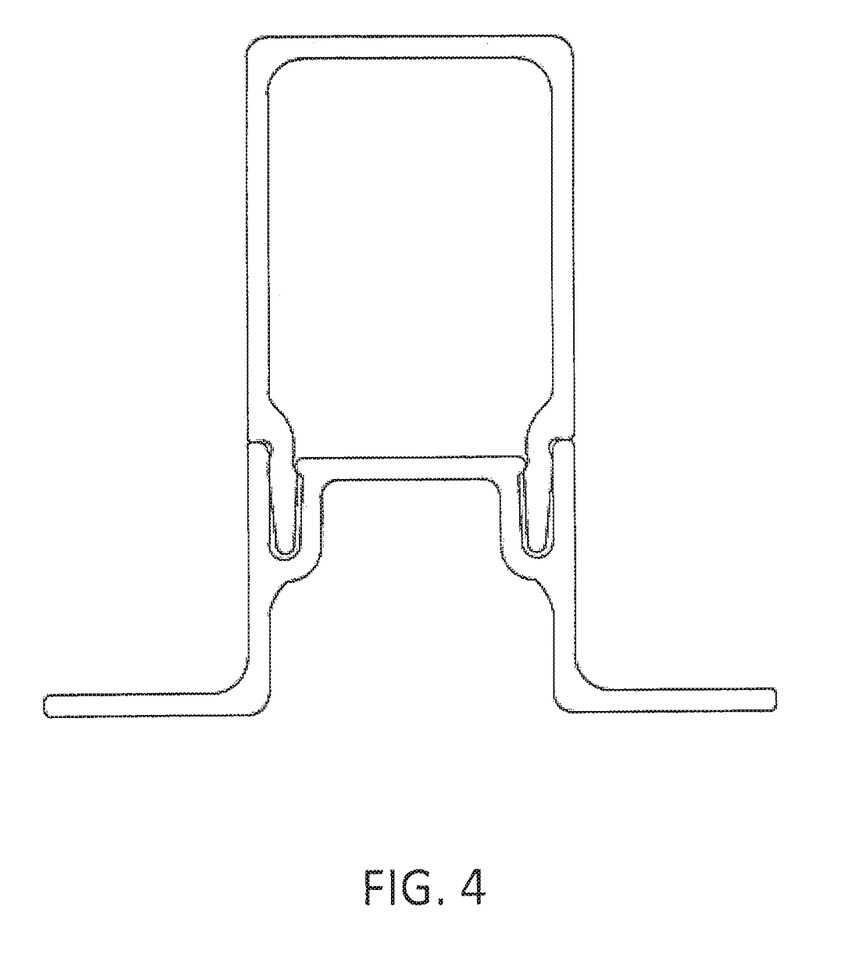
FIG. 4 shows the snap tube of FIG. 3 after assembly.
Figure 5:
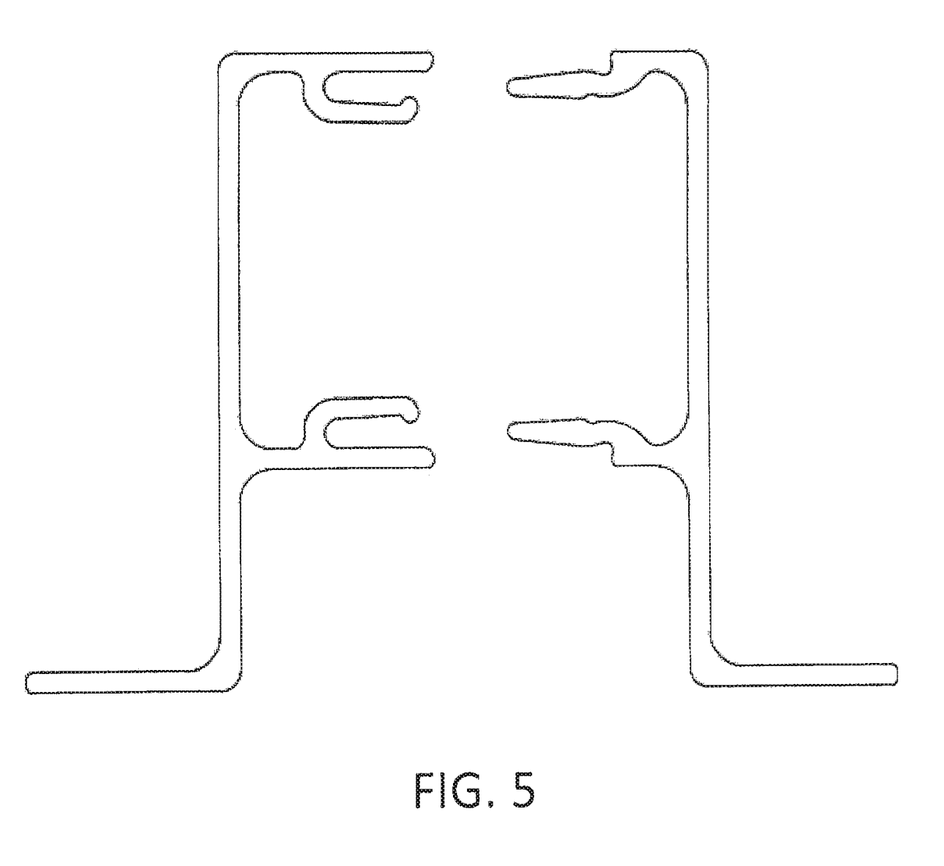
FIG. 5 is a cross-sectional view of a third embodiment of a snap tube prior to assembly.
Figure 6:
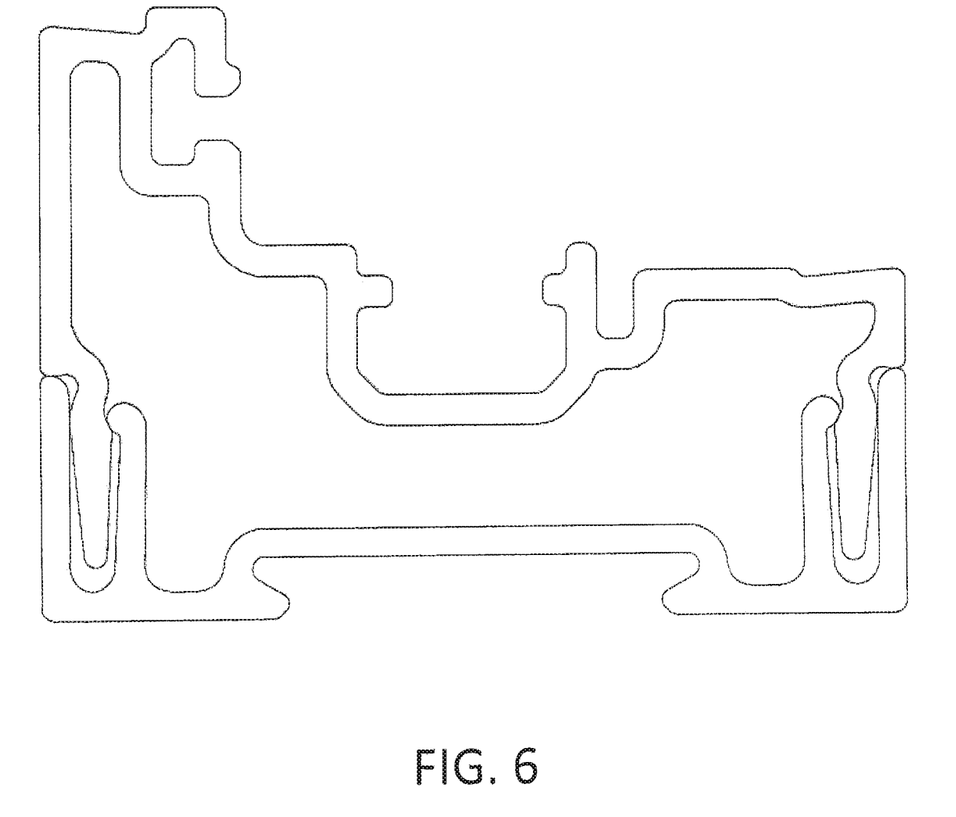
FIG. 6 is a cross-sectional view of a fourth embodiment of a snap tube assembly.

Whereas the embodiment shown in FIG. 2 is constructed from two identical rails, each having both a male and female snap member, in other embodiments, as depicted in FIGS. 3 and 4, each non-hollow rail may have only male or only female snap members. In addition, in other embodiments that are now shown, the hollow profile can be formed from three or more rails that are all joined together.

Preferably, each rail member is formed by a continuous pultrusion process that encapsulates continuous strands or mats of fiberglass within a polymeric resin such as polyurethane, polyester, vinyl ester or epoxy. As used herein, "fiberglass" includes not only glass fibers, but also carbon fibers, basalt fibers, and other reinforcing fibers such as Kevlar. Other materials and manufacturing processes can also be used to produce the non-hollow rails. According to one embodiment two or more rail members can be pultruded simultaneously and snapped together in a continuous, in-line fashion while the pultrusion is ongoing to produce a finished or near finished hollow tube assembly.

Assembly of the snap together rails can be accomplished with or without adhesive depending on the level of structural integrity required by the functional specification. However, regardless of whether or not adhesive is used, the assembled snap tube must function as one hollow shape, which requires significant strength and stability across the snap joints. According to another aspect of the invention, a new snap geometry is employed that provides sufficient strength and other valuable benefits.

Figure 7:
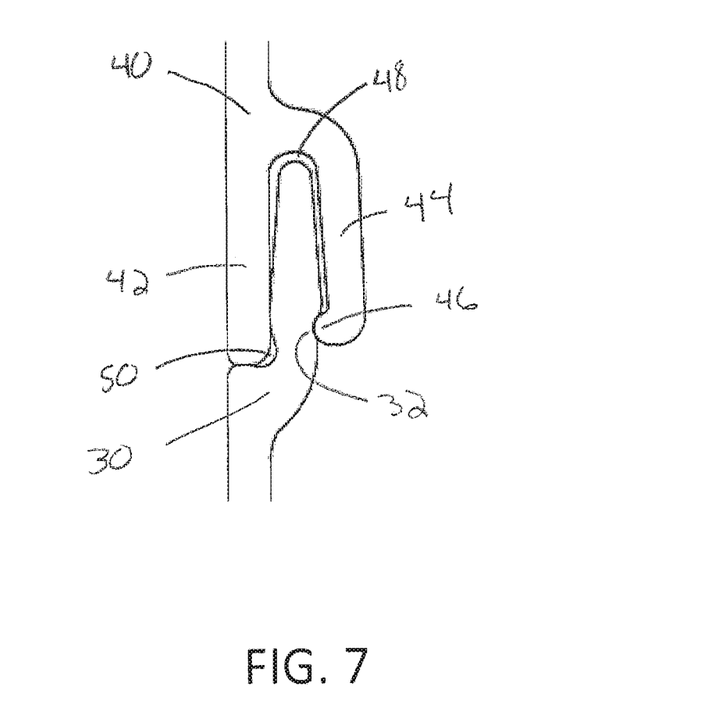
FIG. 7 is a cross-sectional view of a first embodiment of a snap member according to the invention.
Figure 8:
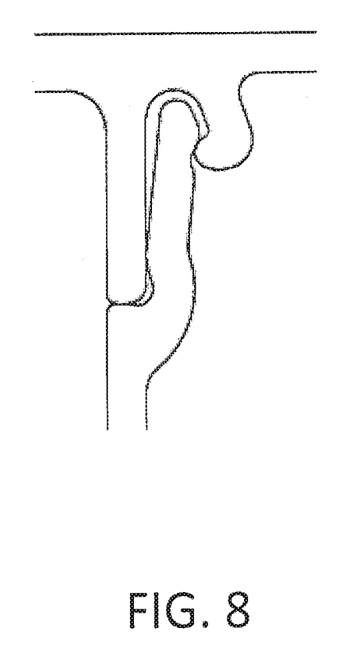
FIG. 8 is a cross-sectional view of a second embodiment of snap member according to the invention.
Figure 9:
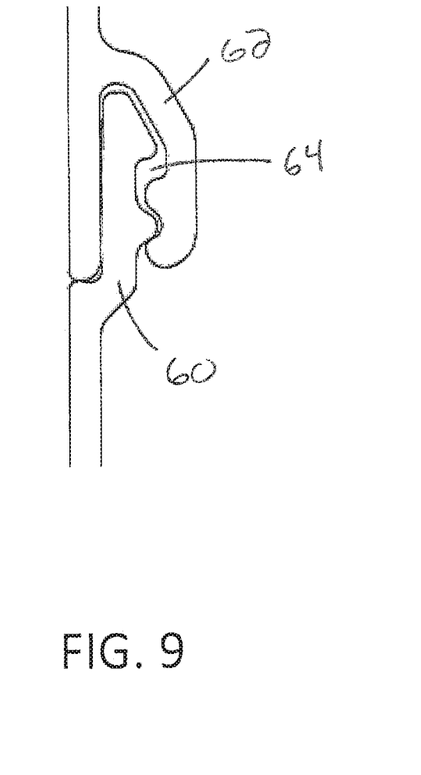
FIG. 9 is a cross-sectional view of a third embodiment of a snap member according to the invention.

Referring to the FIGS. 7-9, three snap configurations are disclosed. Each snap configuration includes a mating male and female member. Referring to FIGS. 7 and 9, the female member is flexible and must elastically deform to engage with the male member. Referring to FIG. 8, the male member is flexible and elastically deflects to engage with the female member.

Referring to FIG. 7, the male snap member 30 has a groove 32 along one side that provides an angled surface for reasons described further below. In the embodiment shown in FIG. 7, the groove 32 is a rounded recess that extends along the length of the male snap member 30. In other embodiments that are not pictured, the groove 32 may be angular with flat sides. In each embodiment, however, the groove 32 provides an angled surface that is neither perpendicular nor parallel to the axis that runs from the base to the tip of the male snap member. In addition, the angled surface is neither perpendicular nor parallel to a direction in which the male snap member 30 is inserted into the female snap member 40.

The female snap member 40 has two legs—a straight alignment leg 42 that serves to align the outer surfaces of two assembled rails, and a compression leg 44, which includes a foot 46 that is received in the groove 32 of the male snap member. When the compression leg 44 of the female snap member 44 presses into the male snap member 30, it produces a clamping forces that pulls the associated rails together. Specifically, elastic deformation of compression leg 44 results in a normal force exerted by the foot 46 in the groove 32. When this force is exerted on an angled surface in the groove 32, it produces a component force along the direction of engagement that urges the male snap member 30 farther into the female snap member 40, clamping them together. This self-clamping feature of the new snap geometry eliminates the need for additional external clamping during the manufacturing process when adhesive is used in the snap joints.

Still referring to FIG. 7, a first gap 48 and a second gap 50 are provided between the male and female snap members, even when fully assembled, where excess adhesive can accumulate rather than being forced out from between the snap to the exterior. This provides a cleaner appearance that more closely resembles a unitary piece rather than a two piece assembly. In some embodiments, only a single gap may be used. In other embodiments more than two gaps may be used. As shown in FIG. 7, at least one gap may be provided directly adjacent to the straight alignment leg 42 of the female snap member where adhesive is most likely to be forced out of the joint.

Referring now to FIG. 9, according to another embodiment the male snap member 60 and female snap member 62 define an interior space 64 when they are engaged. When this space is filed with any substance that will harden, such as an adhesive, it will form a wedge or plug rendering the joint more or less permanently connected. This configuration provides additional mechanical strength and holding power over a joint that is merely adhered together.

Having described the invention in detail and by reference to preferred embodiments thereof, it will be apparent that modifications and variations are possible without departing from the scope of the invention as defined by the following claims.

What is claimed is:

1. An assembly comprising:
   a first elongated component having a male member extending along its length, the male member having a groove extending along its length; and
   a second elongated component having a female member extending along its length, the female member having a first leg and a second leg, one of the first or second legs including a foot, wherein the male member is receivable between the first and second legs of the female member such that the foot of the female member is received in, and engages and exerts a clamping force upon, the groove of the male member to retain the male and female members together.

2. The assembly of claim 1 wherein at least one of the legs of the female member is configured to be sufficiently elastically flexible to move away from the other leg when the male member is inserted into the female member to enable the first and second components to be retained together.

3. The assembly of claim 1 wherein one of the first or second legs of the female member is configured to engage a surface of the male member to limit insertion of the male member into the female member, and wherein the surface of the male member is oriented perpendicular to a direction of insertion of the male member into the female member.

4. The assembly of claim 1 wherein the groove is formed in an outer surface of the male member which is generally smooth and continuous except where the groove is located, and wherein the male member lacks a second groove positioned on an opposite side thereof relative to the groove.

5. The assembly of claim 1 wherein the male member has a thickness extending in a direction perpendicular to a direction of insertion of the male member into the female member, and wherein the male member has generally the same thickness on one side of the groove as on an opposite side of the groove.

6. The assembly of claim 1 wherein the first and second legs of the female member are each generally straight and oriented generally parallel to each other, and wherein the foot of the female member is oriented perpendicular to a direction of insertion of the male member into the female member.

7. The assembly of claim 1 wherein the first elongated component has both a male and a female member, and wherein the second elongated component has both a male and a female member, and wherein the first and second components are configured to together form a hollow tube when retained together.

8. The assembly of claim 1 wherein the first elongated component is identical in shape to the second elongated component.

9. The assembly of claim 1 wherein the first elongated component has only two male members, and wherein the second elongated component has only two female members.

10. The assembly of claim 1 wherein the first elongated component has a number of members, and wherein the second elongated component has a number of members exactly equal to the number of members of the first elongated component.

11. The assembly of claim 1 wherein the male member includes at least one recess located adjacent to a distal end of the first or second leg of the female member when the first and second components are retained together, and wherein the assembly further includes an adhesive positioned in the recess to adhere the first and second components together.

12. An assembly comprising:
a first elongated component having a male member extending along its length, the male member having a groove extending along its length; and
a second elongated component having a female member extending along its length, the female member having a first leg and a second leg, one of the first or second legs including a foot, wherein the male member is receivable between the first and second legs of the female member such that the foot of the female member is received in the groove of the male member to retain the male and female members together, wherein the male and female members are configured to define a first gap between the male member and the first leg of the female member and a second gap between the male member and the second leg of the female member when the first and second components are retained together, and wherein an adhesive is positioned in both the first and second gaps.

13. The assembly of claim 1 wherein the first and second elongated components are both made of fiber reinforced polymer.

14. The assembly of claim 1 wherein the male member has a thickness extending in a direction perpendicular to a direction of insertion of the male member into the female member, and has a thickness at the groove, wherein the female member has a gap width positioned between the foot and the other one of the legs when the male member is not received in the female member, and wherein the thickness of the male member at the groove is greater than the gap width such that when the male member is received in the female member at least one of the first and second legs is deformed or moved to thereby apply the clamping force to the male member in the thickness direction.

15. The assembly of claim 1 wherein the groove is positioned at a base end of the male member, opposite a distal end thereof.

16. An assembly comprising:
a first elongated component having a male member having a groove and an engagement surface; and
a second elongated component having a female member having a first leg and a second leg, one of the first or second legs including a foot, wherein the male member is receivable in a direction of insertion between the first and second legs of the female member such that the foot is receivable in the groove, wherein one of the first or second legs of the female member is configured to engage the engagement surface of the male member to limit insertion of the male member into the female member, and wherein the engagement surface is oriented generally perpendicular to the direction of insertion.

17. A method for making an assembly comprising:
accessing a first elongated component having a male member extending along its length, the male member having a groove extending along its length;
accessing a second elongated component having a female member extending along its length, the female member having a first leg and a second leg, one of the first or second legs including a foot; and
inserting the male member between the first and second legs of the female member such that the foot of the female member is received in the groove of the male member to exert a force that retains the male and female members together.

18. The assembly of claim 1 wherein the first and second elongated components have different shapes.

19. The assembly of claim 16 wherein a distal end of the one of the first or second legs is configured to engage the engagement surface of the male member to limit the insertion of the male member into the female member.

20. The method of claim 17 wherein the force is exerted in a thickness direction of the male member.

* * * * *